United States Patent
Bland et al.

(10) Patent No.: US 6,536,869 B1
(45) Date of Patent: Mar. 25, 2003

(54) HYBRID PRINTMASK FOR MULTIDROP INKJET PRINTER

(75) Inventors: William E Bland, Cardiff; Ian N Kirkwood, Carlsbad; Ronald A Askeland, San Diego, all of CA (US)

(73) Assignee: Hewlett-Packard Company, Fort Collins, CO (US)

( * ) Notice: Subject to any disclaimer, the term of this patent is extended or adjusted under 35 U.S.C. 154(b) by 0 days.

(21) Appl. No.: 09/399,534

(22) Filed: Sep. 20, 1999

(51) Int. Cl.[7] .............................. B41J 2/145; B41J 2/15; B41J 29/38
(52) U.S. Cl. ................................ 347/41; 347/9; 347/12
(58) Field of Search ............................... 347/43, 41, 9, 347/12

(56) References Cited

U.S. PATENT DOCUMENTS

| | | | |
|---|---|---|---|
| 5,555,006 A | 9/1996 | Cleveland et al. | 347/41 |
| 5,600,353 A | 2/1997 | Hickman et al. | 347/43 |
| 5,903,290 A | 5/1999 | Nicoloff, Jr. et al. | 347/43 |
| 6,019,454 A | * 2/2000 | Serra et al. | 347/41 |
| 6,050,675 A | * 4/2000 | Bartolome | 347/41 |

FOREIGN PATENT DOCUMENTS

EP 00307428 12/2000

\* cited by examiner

*Primary Examiner*—Thinh Nguyen (57) ABSTRACT

A swath printer and multipass printing method for improving print quality. The printer minimizes dot placement errors on a printed medium due to depositing drops of ink from lower quality printhead nozzles by providing a printmask having a mask pattern which prints with those nozzles most susceptible to dot placement error using a hi-fipe printmode which deposits into a specific pixel location a small number of drops in each of multiple passes, and a multidrop printmode which deposits into a specific pixel location many drops rapidly in one of the passes. Because such a printer and method prints substantially equally with all printhead nozzles, it does not shorten the useful life of the printhead due to defects associated with the number of times a nozzle deposits ink.

33 Claims, 9 Drawing Sheets

HYBRID PRINTMASK FOR MULTIDROP INKJET PRINTER

CROSS-REFERENCE TO RELATED APPLICATIONS

This application relates to the subject matter disclosed in the co-pending U.S. application Ser. No. 08/682,864, by Majette et al., filed Jul. 2, 1996, titled "Minimizing Color Shift Due to Varying Deposition Order in a Printer with Bidirectionally Scanning In-Line Pens"; the co-pending U.S. application Ser. No. 09/399,473 by Askeland, filed concurrently herewith, titled "Banding Reduction in Multipass Printing"; and the co-pending U.S. application Ser. No. 09/399,430 by Bland et al., filed concurrently herewith, titled "Customizing Printmasks for Printhead Nozzle Aberrations"; all of which are assigned to the assignee of the present invention and hereby incorporated by reference in their entirety.

FIELD OF THE INVENTION

The present invention relates generally to modes of printing with swath-type printing systems. It relates more particularly to printmodes for improving the print quality of output produced by the printhead portion of an inkjet printer.

BACKGROUND OF THE INVENTION

Inkjet printers, and thermal inkjet printers in particular, have come into widespread use in businesses and homes because of their low cost, high print quality, and color printing capability. The operation of such printers is relatively straightforward. In this regard, drops of a colored ink are emitted onto the print media such as paper or transparency film during a printing operation, in response to commands electronically transmitted to the printhead. These drops of ink combine on the print media to form the text and images perceived by the human eye. Inkjet printers may use a number of different ink colors. One or more printheads may be contained in a print cartridge, which may either contain the supply of ink for each printhead or be connected to an ink supply located off-cartridge. An inkjet printer frequently can accommodate two to four print cartridges. The cartridges typically are mounted side-by-side in a carriage which scans the cartridges back and forth within the printer in a forward and a rearward direction above the media during printing such that the cartridges move sequentially over given locations, called pixels, arranged in a row and column format on the media which is to be printed. Each print cartridge typically has an arrangement of printhead nozzles through which the ink is controllably ejected onto the print media, and thus a certain width of the media corresponding to the layout of the nozzles on the print cartridge, can be printed during each scan, forming a printed swath. The printer also has a print medium advance mechanism which moves the media relative to the printheads in a direction generally perpendicular to the movement of the carriage so that, by combining scans of the print cartridges back and forth across the media with the advance of the media relative to the printheads, ink can be deposited on the entire printable area of the media.

The quality of the printed output is a very important feature to purchasers of inkjet printers, and therefore manufacturers of inkjet printers pay a great deal of attention to providing a high level of print quality in their printers. Aberrations in the printhead nozzles can undesirably reduce print quality; such aberrations include, for example, not ejecting ink at all, ejecting an incorrect volume of ink in a drop, producing irregularly shaped drops with artifacts such as tails, or producing a spray of extraneous droplets in addition to the desired drop. Another common type of nozzle aberration is directionality error, also known as dot placement error, in which the drops of ink are not precisely printed in the intended locations on the print media. Different types of printheads can exhibit different types of dot placement errors; these errors are typically due to the design of the printhead and can be characterized for printheads of that particular type. In some types of printheads, it is common for the nozzles located at the top and bottom ends of the printhead to exhibit significant dot placement errors in the direction along the media advance axis, resulting in errors in the swath height, while the nozzles located in the middle of the printhead exhibit less dot placement error. Because the error-prone nozzles print the top and bottom edges of the printed swath in the wrong place, a visually significant print quality defect known as banding results. Banding results in strip-shaped nonuniformities that are visible throughout the printed image.

Banding is more objectionable in areas of the image that contain midtones, rather than highlights (light) or saturated (dark) areas. Dot placement errors are difficult to see in an area of highlights because there is typically so much white space (unprinted areas of the print medium) between the drops of ink that the placement errors are not readily perceived by the human eye. Saturated areas do not exhibit much banding because they contain very little white space, and the large volumes of ink placed in these areas hide most placement errors. But in midtone areas, which have moderate amounts of both white space and ink, small errors in dot placement can have a large effect on how much white space a person perceives.

To minimize banding due to dot placement errors (and coincidentally to also reduce the effect of printing defects resulting from having too much ink on the print medium at one time, such as bleeding of one color area into another and warping or wrinkling of the print media), most printers do not print all the required drops of all ink colors in all pixel locations in the swath in one single scan, or "pass", of the printheads across the media. Rather, multiple scans are used to deposit the full amount of ink on the media, with the media being advanced after each pass by only a portion of the height of the printed swath. In this way, areas of the media can be printed in on more than one pass. In a printer which uses such a "multipass" printing mode, only a fraction of the total drops of ink needed to completely print each section of the image is laid down in each row of the printed medium by any single pass; areas left unprinted are filled in by one or more later passes. When printing of a page is complete, every area of the print medium has typically been printed on by the same multiple number of passes. Because each pass uses a different nozzle to print a particular row of the image, multipass printing can compensate for nozzle defects. To illustrate how this compensation works, consider the defect where one particular nozzle in a single-pass printmode does not work at all, causing an unprinted row (or band) of unprinted pixel locations to appear in the printed image. However, if a four-pass printmode is used instead of a single pass, the defective nozzle will only print one out of every four drops in that row, making the impact of the defective nozzle less objectionable. While the above example, for illustration, used a broken nozzle, the same principle applies to nozzles with directionality errors which print ink at incorrect locations.

However, a multipass printmode where all nozzles can deposit the same number of drops of ink is often insufficient to improve print quality to an acceptable level, particularly when specific groups of nozzles have worse errors than other groups, as in the case of swath height error as described above. Therefore, some other approaches to improving print quality have modified the printmode such that all nozzles no longer print the same number of ink drops. For instance, a printmode which prints with only the middle nozzles of a printhead which exhibits swath height error results in improved print quality. However, such an approach has the drawback of significantly increasing the amount of time it takes to print a page, because a smaller swath is printed on each pass.

Other printmodes improve print quality by printing using all nozzles, but depositing fewer drops from the end nozzles than the middle nozzles. Examples of such printmodes are described in the co-pending and commonly-assigned European patent application Ser. No. 99301151.9, by Vinals, filed Feb. 17, 1999, titled "Printing Apparatus and Method", which is hereby incorporated by reference in its entirety. Other such examples are described in the above-referenced copending and commonly-owned U.S. patent application Ser. No. 09/399,473 by Askeland titled "Banding Reduction in Multipass Printing". Because some nozzles print less than other nozzles in these printmodes, all nozzles do not have the same "print load". As a result, in many cases the useful life of the printhead will be reduced, because kogation (a buildup of residue on the surface of a nozzle's firing resistor), cavitation damage (physical damage to the surface of the nozzle's firing resistor), and other detrimental effects related to the number of times a nozzle deposits ink drops will adversely affect the more frequently used nozzles sooner than would occur if all nozzles had an equal print load.

Just as important to an inkjet printer purchaser as print quality is the useful life of the printhead. In order to maintain print quality, printheads are often replaced by users once any nozzle or group of nozzles degrades to a point where print quality is adversely affected. Accordingly, there is still a need for an inkjet printer that minimizes print quality defects due to nozzle aberrations but without significantly reducing the useful life of the printhead.

SUMMARY OF THE INVENTION

In a preferred embodiment, the present invention provides a multipass swath printing system that improves the quality of the printed output by enabling lower-quality nozzles with a greater tendency toward dot placement errors to deposit into a specific pixel location a small number of drops in each of several printing passes, and enabling higher-quality nozzles with a lesser tendency toward dot placement errors to deposit into a specific pixel location many drops rapidly during at least one of the printing passes. Because the number of drops enabled for deposition from all nozzles is substantially identical, such a printing system provides improved print quality without a significant reduction in useful life of the printhead.

An embodiment of the printing system according to the present invention includes a printhead mounted in a carriage which is attached to a frame for relative motion with respect to a print medium. The printhead has an arrangement of nozzles through which ink is ejected onto a pixel grid of multiple rows on the print medium when the carriage makes a printing pass. The system also contains a print controller which activates the nozzles to deposit the ink onto the medium, as governed by a printmask. The printmask defines predetermined groups of nozzles to be activated to deposit ink at specific locations in the pixel grid during multiple printing passes of the printhead over the print medium, and the amount of ink to be deposited into the specific locations, based on statistical or theoretical determination of expected dot placement error from the nozzles. The printmask has a "hi-fipe" mask subpattern associated with a first group of the nozzles enabling each nozzle to deposit a small number of drops (typically one) into specific locations during each of several of the passes, and a "multidrop" mask subpattern associated with a second group of the nozzles enabling each nozzle to many drops (typically two to four) rapidly into specific locations during at least one of the passes. In printheads which are linearly extended along the media advance axis, the first group of nozzles is substantially near ends of the printhead, and the second group of nozzles is substantially away from the ends of the printhead. In a preferred embodiment, the printmask also has a composite mask subpattern associated with a third group of the nozzles enabling each nozzle to both deposit a small number of drops into specific locations during each of several of the passes, and many drops rapidly into specific locations during at least one of the passes. The third group of nozzles is disposed between the first and second groups, and the mask subpattern is preferentially graduated such that the small number of drops predominate for nozzles adjacent the first group, and the many drops predominate for nozzles adjacent the second group.

More than one printhead may be included in the swath printing system. In some embodiments, all the printheads are aligned relative to each other such that each printhead deposits the ink in substantially an identical swath in a single pass. In an alternate embodiment, the printheads are offset relative to each other such that each printhead deposits the inks in substantially a different swath in a single pass. In still another embodiment, the printheads are partially aligned relative to each other such that two adjacent printheads deposit the inks in an overlapping swath in a single printing pass. Each printhead may be mounted in an individual cartridge, or multiple printheads may be mounted in a same cartridge, such as a tri-color cartridge containing three printheads. The three printheads may be aligned relative to each other such that the printheads deposit the inks in substantially an identical swath in a single printing pass, or may be offset relative to each other such that the printheads deposit the inks in different swaths in a single printing pass.

The present invention may also be implemented as a method for incremental printing with an inkjet swath printer. The method preferably includes establishing a pixel grid on a print medium by depositing drops of ink in multiple printing passes of a printhead over the print medium in a scan direction and advancing the medium in a media advance direction between at least some of the multiple printing passes, and printing into a specific pixel of the grid by depositing both a small number of drops in each of several of the printing passes and many drops rapidly during at least one of the printing passes. Regardless of the printing mode used for different nozzles, all nozzles are enabled to print substantially the same amount of ink into the pixel grid. In printheads which are linearly extended along the media advance axis, the first group of nozzles is substantially near ends of the printhead, and the second group of nozzles is substantially away from the ends of the printhead.

Other aspects and advantages of the present invention will become apparent from the following detailed description, taken in conjunction with the accompanying drawings, illustrating by way of example the principles of the invention.

DESCRIPTION OF THE PREFERRED EMBODIMENT

Figure 1:
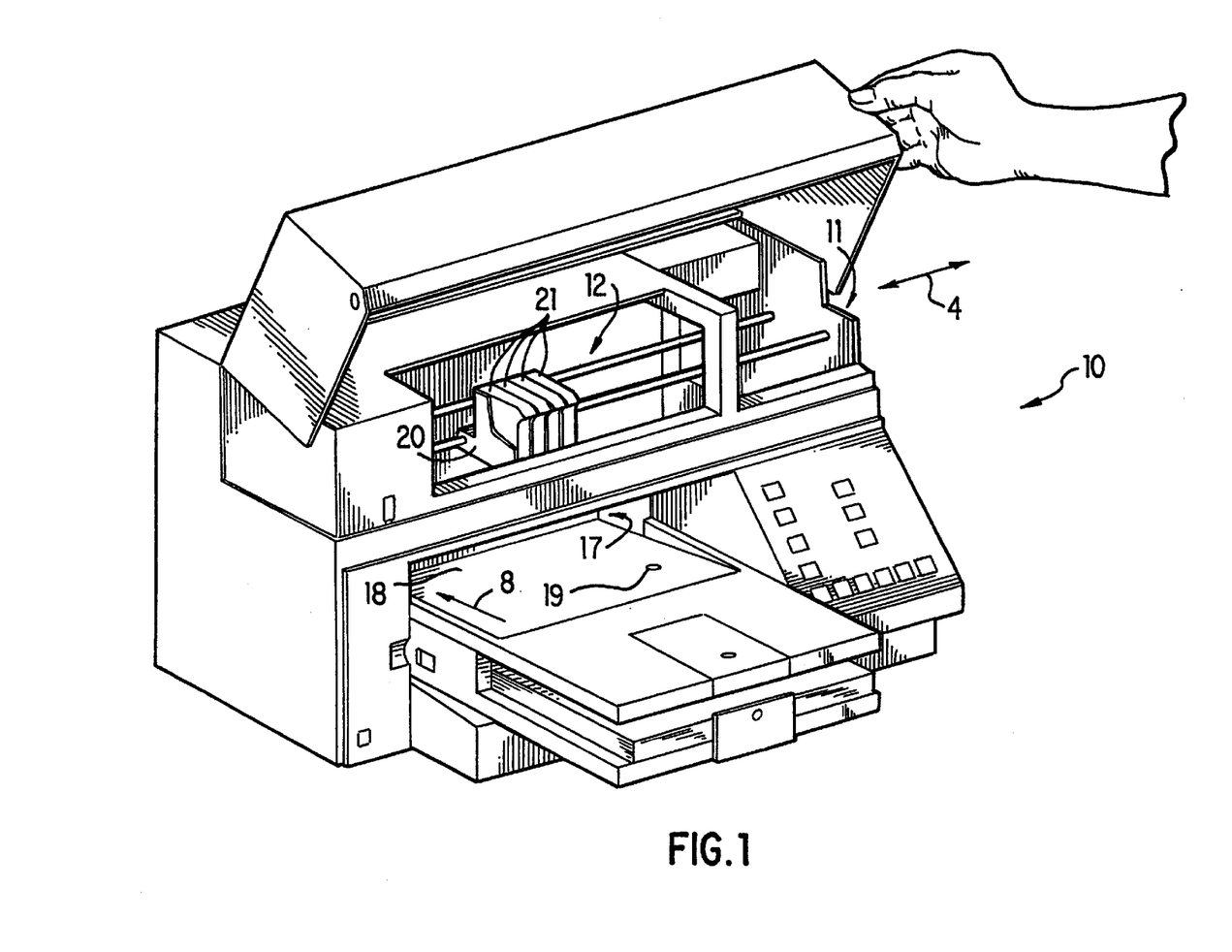
FIG. 1 is a perspective view of an inkjet printer embodying the present invention.
Figure 2:
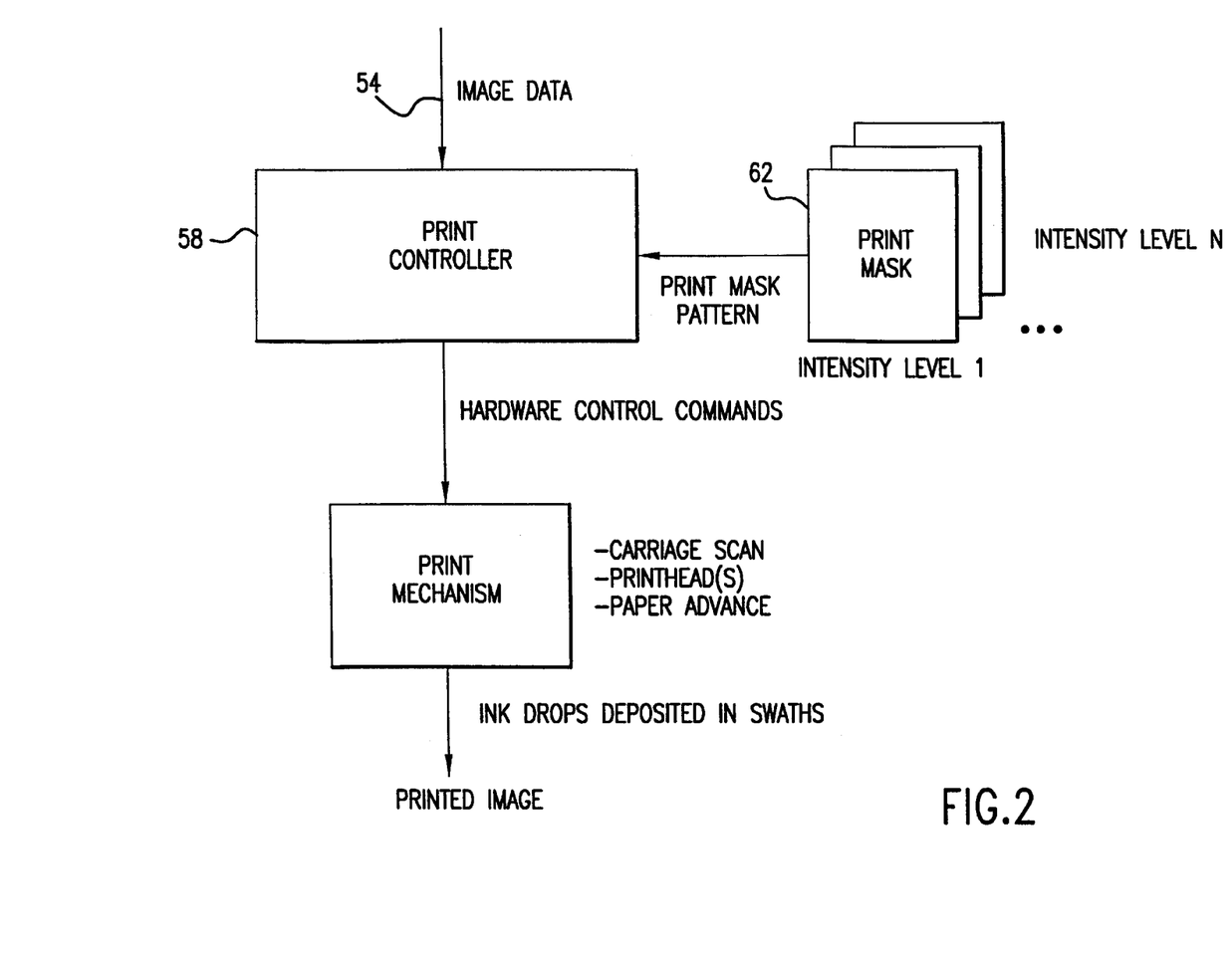
FIG. 2 is a block diagram of the major writing system sections of the inkjet printer of FIG. 1.

Referring now to the drawings, and more particularly to FIGS. 1 and 2, there is illustrated a printer 10 constructed in accordance with the present invention which reduces visually objectionable banding that occurs due to nozzle aberrations, and does so without reducing printer throughput. A preferred embodiment of the printer 10 includes a frame indicated generally at 11 on which a carriage 20 is moveably mounted. The carriage 20 has stalls for holding at least one printhead 21 (FIG. 1 illustrates by way of example four printheads 21) and transporting them in a printing orientation adjacent the surface of a print medium 18 having a plurality of pixel locations, such as pixel location 19, organized in a rectangular array of rows and column. The carriage 20 is mounted in the frame 11 for relative motion with respect to the print medium 18 in a printing pass. Each printhead 21 has a plurality of nozzles 24 through which drops of ink 26a–b are ejected onto the print medium 18 to form an image, which may contain any combination of text, graphics, or photographs. As will be discussed hereinafter in further detail, the plurality of nozzles 24 is logically arranged as a linear array of nozzles substantially orthogonal to a scan axis 4. Typically each printhead contains a different color ink. The carriage 20 is moveable along the scan axis 4 by a carriage advance mechanism, indicated generally at 12, mounted within the frame 11. The printer 10 also has a print medium advance mechanism indicated generally at 17 mounted within the frame 11 which advances the print medium 18 along a medium advance axis 8 so as to change the row on which an individual nozzles prints (the carriage advance mechanism 12 and the print medium advance mechanism 17 are well known to those skilled in the art, and will not be discussed further hereinafter). A print controller 58 controls the carriage 20 and media 18 movements and activates the nozzles for ink drop deposition. By combining the relative movement of the carriage 20 along the scan axis 4 with the relative movement of the print medium 18 along the medium advance axis 8, each printhead 21 can deposit one or more drops of ink 26 at each individual one of the pixel locations 19 on the print medium 18. A printmask 62 is used by the print controller 58 to govern the deposition of ink drops from the printhead 21. Typically a separate printmask 62 exists for each discrete intensity level of color (eg. light to dark) supported by the printer 10. For each pixel position 19 in a row during an individual printing pass, the printmask 62 has a mask pattern which both (a) acts like a "gate" to enable the nozzle positioned adjacent the row to print, or disable that nozzle from printing, on that pixel location 19, and (b) defines the number of drops to be deposited from enabled nozzles. Whether or not the pixel will actually be printed on by the corresponding enabled nozzle depends on whether the image data 54 to be printed requires a pixel of that ink color in that pixel location. The printmask 62 is typically implemented in firmware in the printer 10, although it can be alternatively implemented in a software driver in a computing processor (not shown) external to the printer. According to the present invention, in order to improve print quality, the mask is constructed such that, as will be described hereinafter in greater detail, nozzles of lower quality print using a hi-fipe technique which enables the depositing into a specific pixel location of a small number of drops in each of several of the passes, and nozzles of higher quality print using a multidrop technique which enables the depositing into a specific pixel location many drops rapidly during at least one of the passes.

Figure 3:
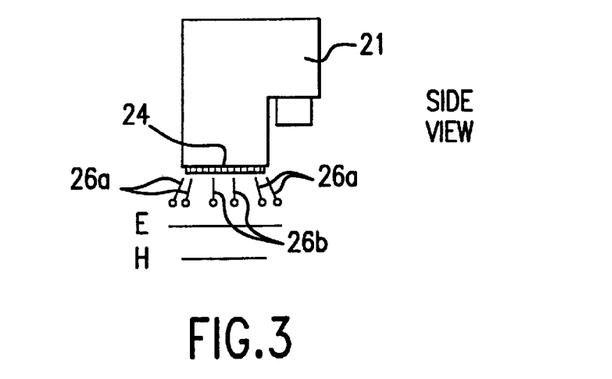
FIG. 3 is a schematic diagram illustrating the dot placement error occurring in a type of printhead usable with the printer of FIG. 1.
Figure 4A:
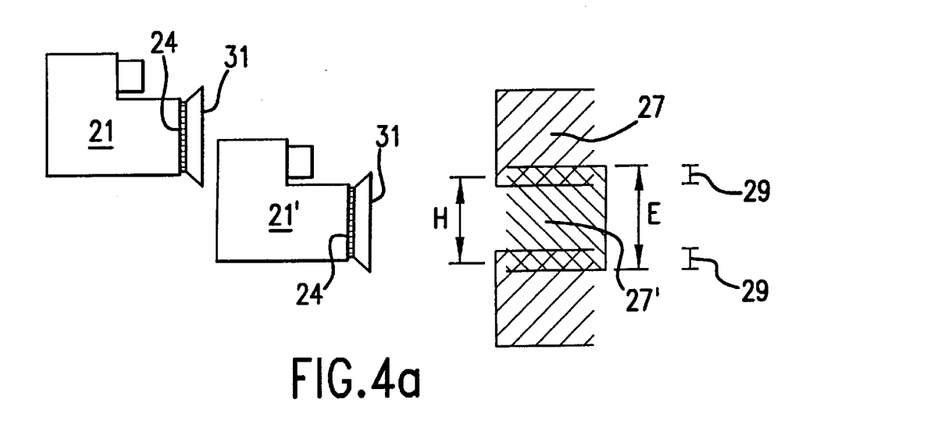
FIGS. 4A–4B are schematic diagrams illustrating the banding which can result from printing with the printhead of FIG. 3.
Figure 4B:
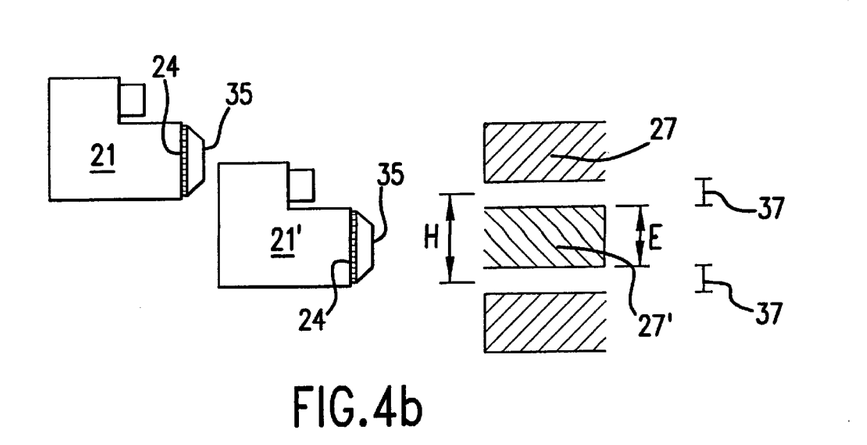

Before discussing the structure and operation of the printmask 62 in further detail, it is beneficial to consider for purposes of illustration one particular type of print quality defect that the present invention can be used to mitigate. As best understood with reference to FIG. 3, a plurality of nozzles 24 arranged columnarly in the printhead 21 eject ink onto the print medium. Some of the nozzles may not deposit ink drops precisely in the intended locations, but rather place them in an actual location different from the intended location by some amount of directionality error. This directionality or dot placement error may have a component in the direction of the scan axis 4 (known as scan axis directionality, or SAD, error), and a component in the direction of the media or paper advance axis 8 (known as paper axis directionality, or PAD, error). Embodiments of the present invention can improve the print quality produced from printheads which exhibit either SAD, PAD, or both SAD and PAD. However, for purposes of illustration, the discussion herein will proceed with reference to a printhead 21 in which those nozzles adjacent the ends of the column of nozzles 24 have a greater tendency for PAD error in which the drops of ink 26a ejected from end nozzles are not precisely printed in the intended locations on the print medium, whereas drops of ink 26b ejected from middle nozzles have less of a tendency for PAD error and thus are more likely to be printed close to the intended locations. Printing with such a printhead 21 produces a printed swath of height E, rather than a swath of height H as desired, the difference between E and H defining the swath height error. As explained with reference to FIGS. 3a–3b, the direction of the dot placement PAD error can either be outward 31 from the column of nozzles, or inward 35 toward the center of the nozzle column 24. Although the present invention relates to multipass printmodes, for ease of understanding FIGS. 4a–4b illustrates a printhead operating in a single-pass printmode. In a first pass, printhead 21 prints swath 27, then advances a distance in the media advance axis 8 the fill height of the printhead 21, and finally printhead 21' prints a second swath 27' in a second pass. Where the direction of the swath height error is outward 31 as in FIG. 4a, an overlapping band 29 is formed by the ink deposited from the misdirecting nozzles. Where the direction of the swath height error is inward 35 as in FIG. 4b, an unprinted band 37 remains after the ink is ejected from the misdirecting nozzles.

Figure 5:
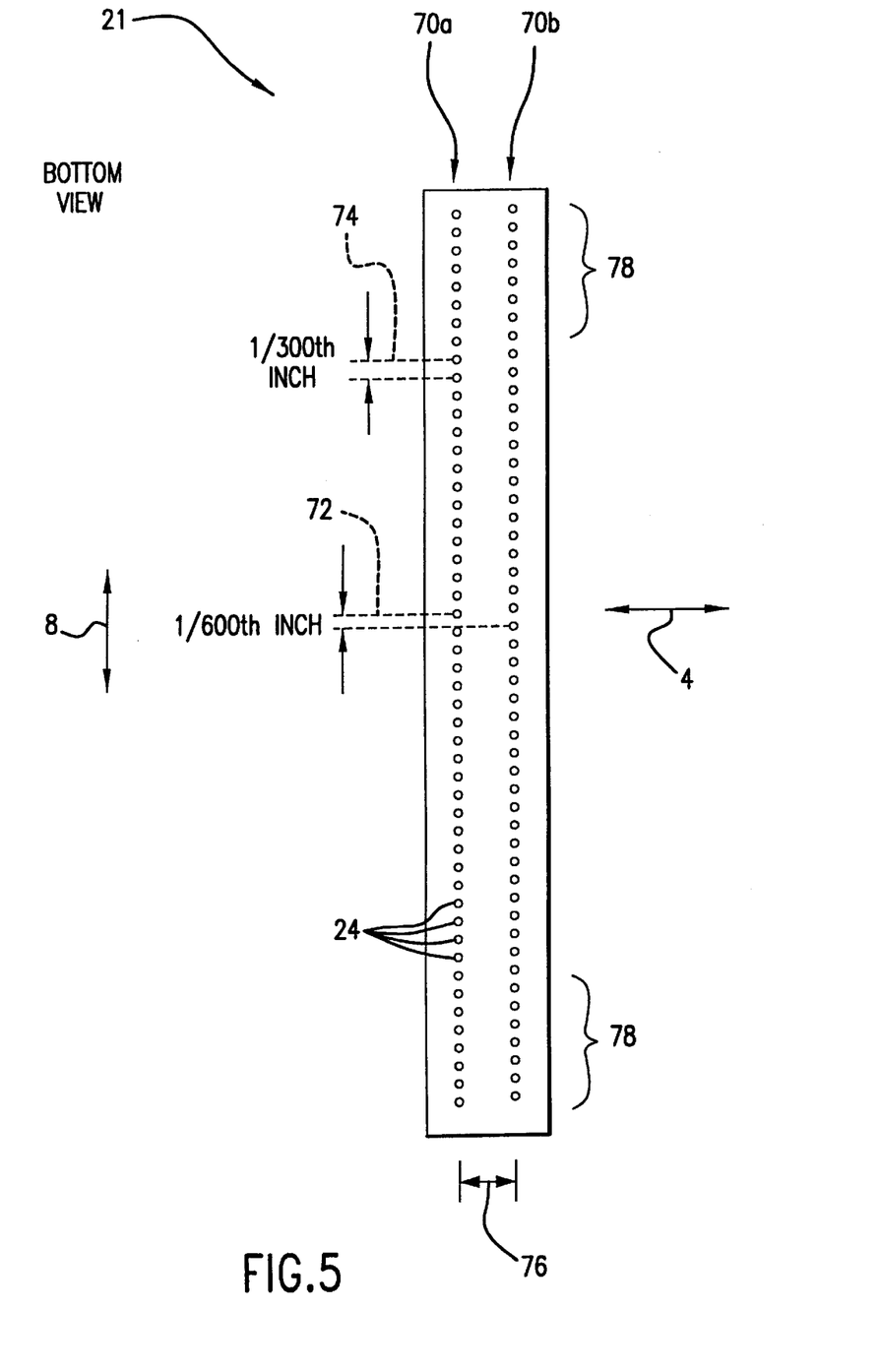
FIG. 5 is a schematic diagram of the nozzle arrangement of a printhead usable with the printer of FIG. 1.

As is well known to those skilled in the art, printheads are typically formed on silicon substrates. One or more printheads, each for a different ink, may be formed on a single substrate. Considering now the plurality of nozzles 24 in greater detail with reference to FIG. 5, a preferred embodiment of a printhead 21 has two vertical columns 70a–b of nozzles 24 which, when the printhead 21 is installed in the printer 10, are perpendicular to the scan axis 4. The columnar vertical spacing 74 between adjacent nozzles in a column is typically 1/300th inch in present-day printheads. However, by using two columns instead of one and logically treating the nozzles as a single column, the effective vertical spacing 72 between logical nozzles is reduced to 1/600th inch, thus achieving improved printing resolution in the direction of the media advance axis 8. As an illustration, the print controller 58 would print a vertical column of 1/600th inch pixel locations on the print medium 18 by depositing ink from column 70a, then moving the printhead 21 in the scan axis direction 4 an amount equal to the inter-column distance 76 before depositing ink from column 70b. The misdirecting nozzles that contribute to swath height error are most frequently located in sections 78 adjacent to the top and bottom ends of the printhead 21. While not every nozzle in sections 78 will necessarily substantially misdirect ink, nozzles in these sections have a higher probability of significant ink misdirection. Conversely, while not every nozzle outside of these sections will print in the desired location, most of them will do so; they have a lower severity of directionality errors. The nozzle directionality errors for certain printheads can be determined in a number of different ways, including statistically by analyzing dot placement error data derived from many tested samples of the printhead, theoretically by estimating dot placement error based on the design of the printhead, or by the statistical and theoretical methods in combination.

The term "printing pass", as used herein, refers to those passes in which the printhead is enabled for printing as the nozzle arrangement moves relative to the medium 18 in the scan axis direction 4; in a bidirectional printer, each forward and rearward pass along the scan axis 4 can be a printing pass, while in a unidirectional printer printing passes can occur in only one of the directions of movement. during each printing pass. The nozzle arrangement 24 is divided into sections, the number of sections equaling the number of printing passes required to fully ink each subswath, and the height of the section corresponding to the distance in the media advance direction 8 that the medium 18 is advanced after the corresponding printing pass.

Figure 6A:
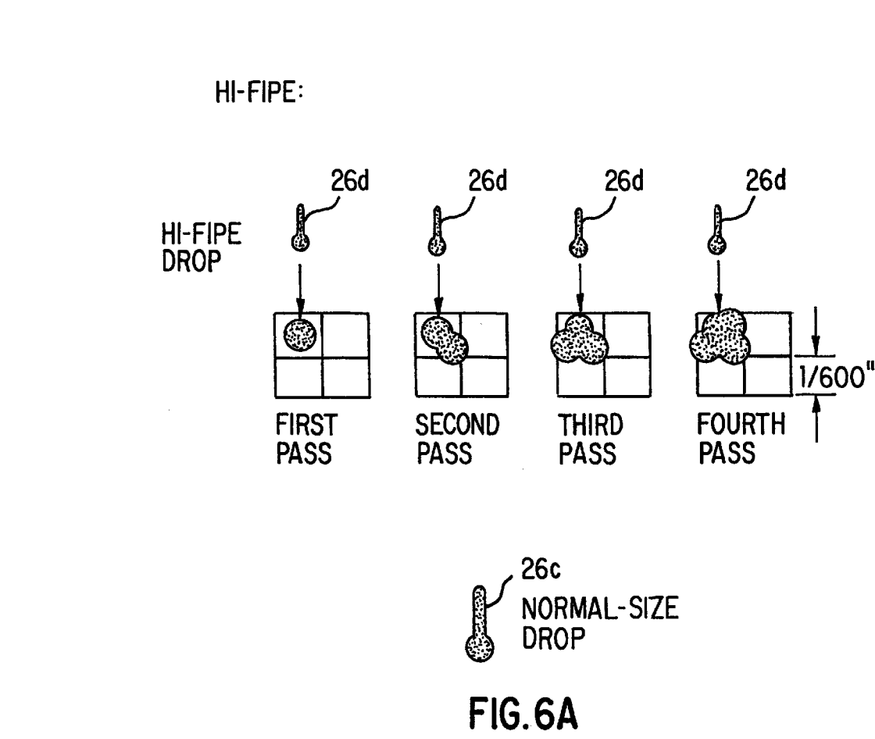
FIGS. 6A–6B are schematic diagrams illustrating the operation, respectively, of the hi-fipe printmode and the multidrop printmode usable with the printer of FIG. 1.
Figure 6B:
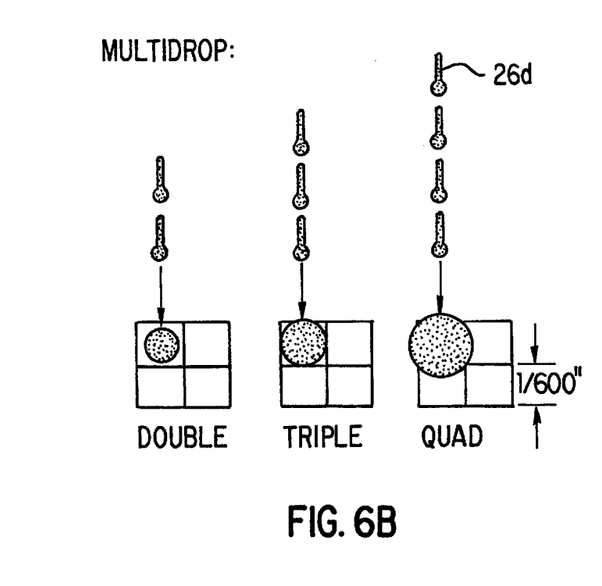

Bearing in mind the previous discussion of dot placement errors, it is helpful for understanding the present invention to consider the two printmode techniques that are used in an embodiment of the present invention. The first is "hi-fipe" printing, a printmode technique best illustrated in FIG. 6A in which, instead of printing a pixel on the medium 18 using a normal-size ink drop 26c deposited on one particular printing pass, a number of smaller ink drops 26d are deposited in a number of different printing passes in order to completely deposit the equivalent amount of ink in the normal-size drop 26c on that pixel. Typically, only one smaller ink drop 26d is deposited in each different printing pass. While hi-fipe printing reduces the undesireable effects of dot placement error because different nozzles print the pixel location in different passes, it is less effective at covering white space in mid-tone regions of an image because the slight variations in drop placement within a pixel that are required to fill the white space can be difficult to achieve on separate passes from different nozzles. The other printmode technique utilized in the present invention is "multidrop" printing, as best illustrated in FIG. 6B, in which many (typically two to four) smaller ink drops 26d are deposited into a target pixel in extremely rapid succession in at least one printing pass to fully ink the pixel. These drops tend to merge either in transit or after they are on the print medium, and by virtue of the larger amount of ink deliberately deposited in a brief time, the overall liquid deposit in the pixel tends to spread out and fill more of the area of the pixel. If a sufficient number of drops (eg. four) are deposited in a single printing pass, the area of the pixel 19q is filled completely, so that there is no white space left at pixel location edges to cause unprinted white dots at the corners of pixels. However, multidrop printing by itself has not been a useful technique for minimizing the effects of dot placement errors, because all the multiple drops might be deposited by a misdirected nozzle. The above printmode techniques are described in additional detail in the above-referenced co-pending "Hybrid Multi-Drop/Multi-Pass Printing System" application by Askeland et al., which advantageously combined the two techniques in a single printmode by printing image areas containing highlights and light midtones with conventional multidrop printing, but printing image areas that were saturated or contained darker midtones by depositing a second multidrop dot from the printhead in a different pass.

Returning now to the printmask 62 for a particular intensity level according to the resent invention and bearing the previous discussions in mind, the printmask 62 uses both hi-fipe and multipass techniques in a novel manner to define the pattern of ink drops used by the print controller 58 to partially print a swath of the image during each pass. In a given pass of the carriage 20 over the print medium 18 in a multipass printer 10, only certain pixel locations 19 enabled by the printmask 62 can be printed, and the printer 10 deposits the number of drops specified by the printmask 62 for the corresponding pixel locations 19 if the image data so requires. The printmask pattern is such that additional drops for the certain pixel locations, as well as drops for other pixel locations in the swath, are filled in during other printing passes. A printmask 62 according to the present invention has a mask pattern which uses predominantly a hi-fipe printmode on nozzles which tend to exhibit significant dot placement error, such as nozzles adjacent the ends of the columns 70a–70b of the printhead 21. Using hi-fipe printing, where a small number of drops are deposited into a specific pixel location in each of several passes with the print medium advancing between each pass, ensures that different nozzles will print on the specific pixel location 19 in different passes. The amount the medium is advanced may be chosen to ensure that at least some nozzles with low dot placement error, such as the nozzles in the middle of the columns 70a–70b, will be enabled to print on each specific pixel location. Using multidrop printing for nozzles with low dot placement error, where many drops are rapidly deposited into a specific location in at least one of the passes, ensures that unprinted white space at the edges of pixel locations 19 will be minimized due to the improved ink coverage of the pixel locations provided by multidropping.

Figure 7:
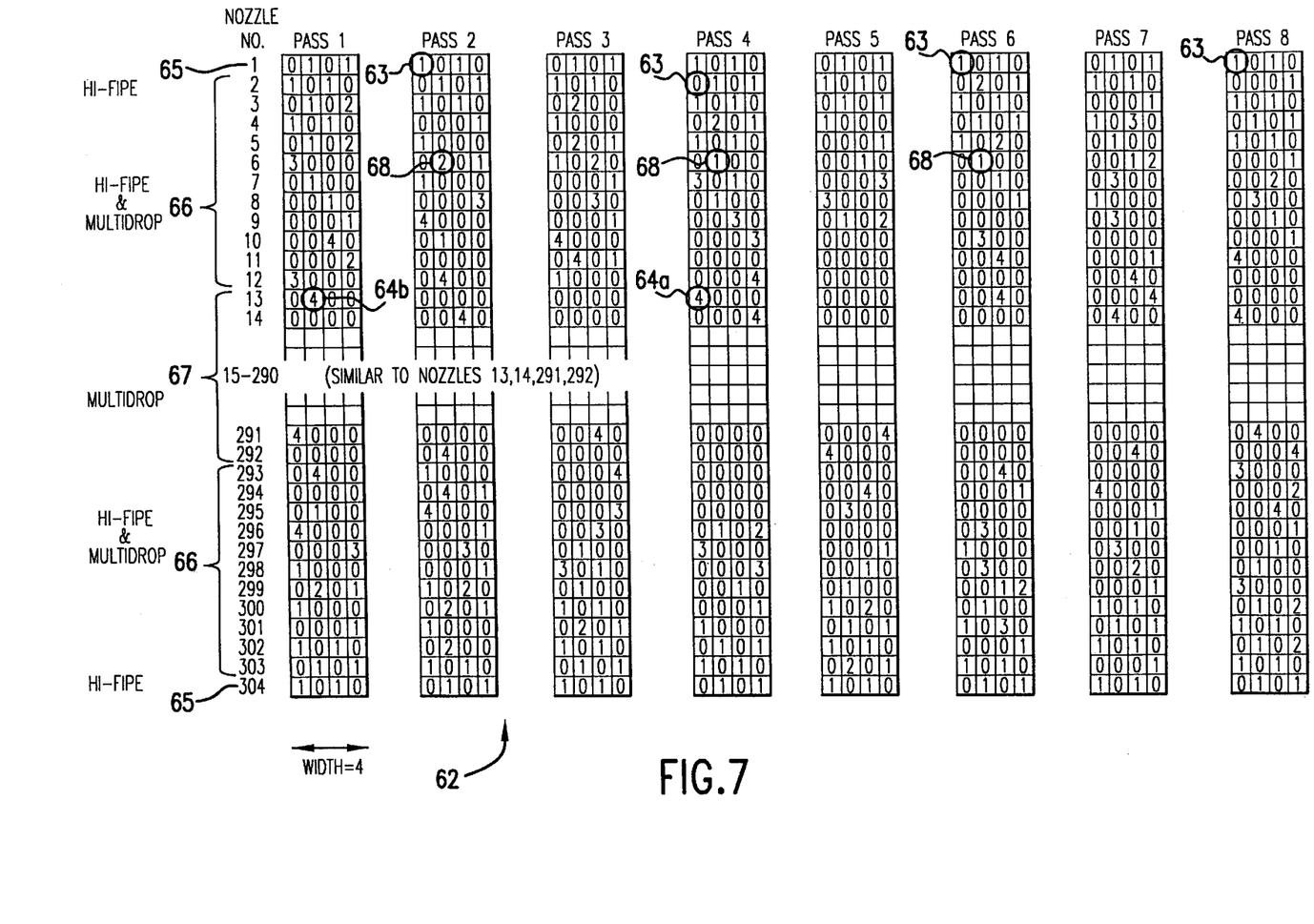
FIG. 7 is a schematic diagram illustrating a mask pattern according to the present invention which is usable with the printer of FIG. 1.

Continuing the discussion of the printmask 62, and as best illustrated in FIG. 7, there is depicted an exemplary printmask pattern for a printhead having 304 nozzles and operated in an eight-pass printmode. For illustrative and not limiting purposes, the printmask 62 represents an intensity level which enables four drops to be printed per pixel location 19 after all eight passes are complete. The number of drops and passes on which ink can be deposited can be set independently for each nozzle; such a printmask is often referred to as "printhead high". The printmask 62 is four cells in width, and thus the printmask is replicated across the sheet of print medium 18 as required to govern the printing of all pixel locations 19 printable on each row. The number ("0" to "4") within each cell of the printmask defines the number of drops of the particular color ink that are enabled for deposition from that nozzle onto the print medium (if the image data so requires) in the printing pass indicated. A cell value of "0", therefore, disables the nozzle from printing in the corresponding pixel location in that pass.

Printmask cells 67 used for nozzles in the middle of the printhead 21 operate in a pure multidrop mode. For example, four drops are enabled for deposition in a pixel location corresponding to the left-mode position of the printmask 62 by nozzle number 14 in pass four, as indicated at 64a, with no drops deposited by that nozzle in any other passes. Similarly, four drops are enabled for deposition in a pixel location 19 corresponding to the second-from-left-most position of the printmask 62 by nozzle number 14 in pass one, as indicated at 64b, with no drops deposited by that nozzle in any other passes. Conversely, printmask cells 65 used for nozzles in the middle of the printhead 21 operate in a pure hi-fipe mode. For example, one drop is enabled for deposition in a pixel location 19 corresponding to the left-most position of the printmask 62 by nozzle number 1 in each of passes two, four, six, and eight, as indicated at 63, for a total of four drops. Printmask cells 66 used for in-between nozzles 66 operate in a hybrid hi-fipe/multidrop printmode. For example, two drops are enabled for deposition in a pixel location 19 corresponding to the left-most position of the printmask 62 by nozzle number 6 in pass two, with one drop enabled in passes four and six, as indicated at 68, for a total of four drops. The allocation between hi-fipe and multidrop allocation varies for in-between nozzles 66, with those nozzles closer to end nozzles 65 exhibiting predominantly hi-fipe behavior, and those nozzles closer to middle nozzles 67 exhibiting predominantly multidrop behavior. This allows a gradual rather than abrupt change between sections of the printhead having higher and lower likelihood of dot placement errors, resulting in higher print quality.

Regardless of whether nozzles operate in a hi-fipe, multidrop, or hybrid mode, each nozzle is enabled to print substantially the same amount of ink. Because of the equal print load on all nozzles, a printer according to the present invention does not suffer shortened printhead life due to wearout effects from more frequently used nozzles.

While the illustrative examples of a printmask 62 according to the invention in FIG. 7 uses a four-cell wide printmask and an eight-pass printmode, the preferred embodiment of the invention uses a printmask 62 that is 64 cells in width for a four-pass printmode. The use of a wider printmask allows a more random distribution of ink drops to improve print quality, and the use of fewer passes increases throughput.

Figure 8:
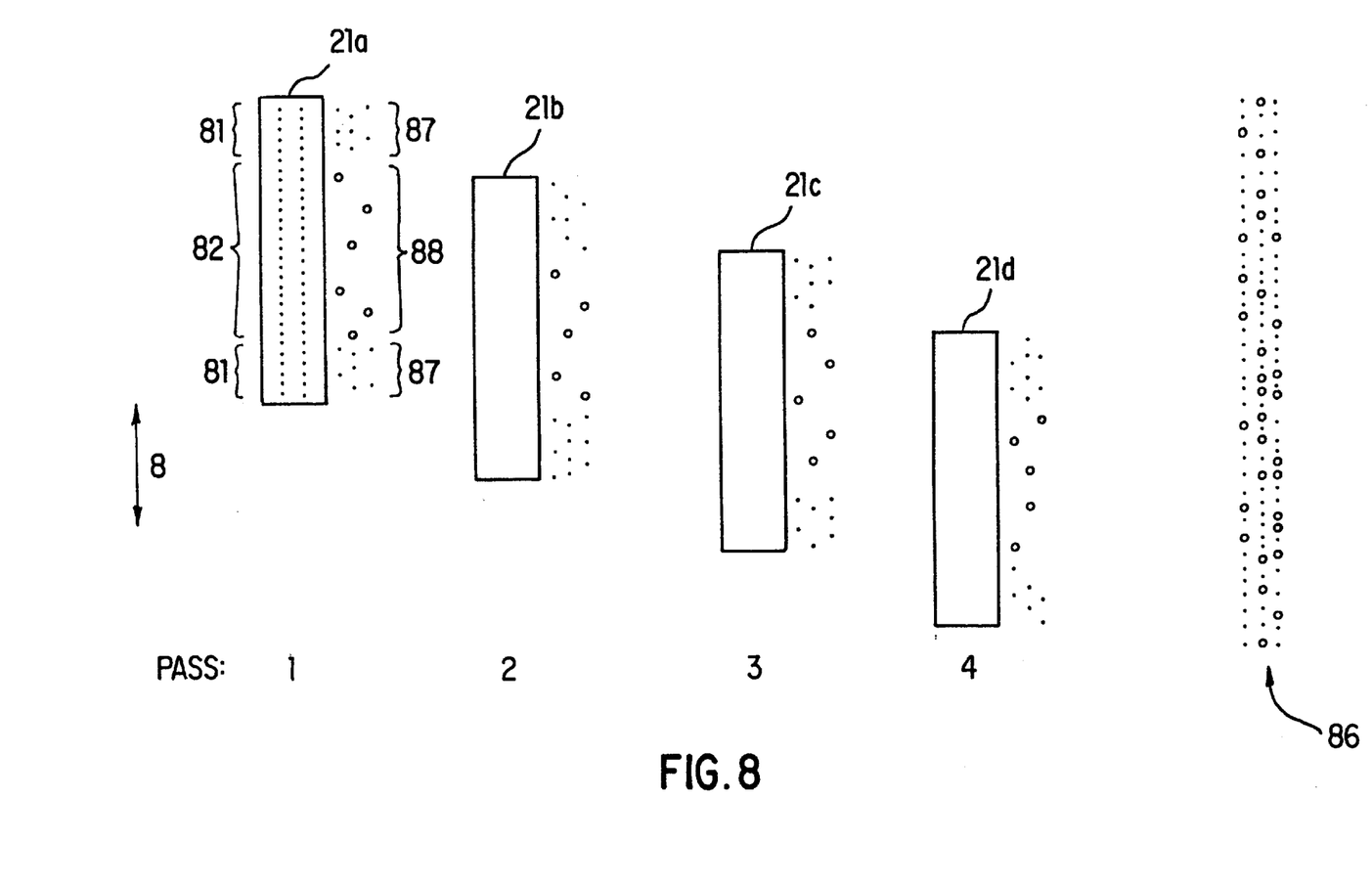
FIG. 8 is a schematic diagram illustrating the positioning in the medium advance direction of the printhead during each of the four passes of a four-pass printmode, the differently-sized ink drop pattern produced by hi-fipe and multidrop nozzles in a single pass, and how advancing the medium between passes has the effect of intermingling the differently-sized drops on the printed medium.

To further illustrate the operation of a printmask 62 according to the present invention and the resulting output on the print medium 18, and with reference to FIG. 8, a four-pass printmode according to the present invention has a printhead 21 in which end nozzles 81 operate in pure hi-fipe mode and middle nozzles 82 operate in a pure multidrop mode. Each individual pass, such as Pass 4, partially prints a section of the image as governed by the mask pattern for that pass, with the end nozzles 81 depositing single drops 87, and the middle nozzles 82 depositing multiple drops 88. The print medium 18 is advanced after every printing pass (ignoring the special case of the top and bottom of a page), resulting in printhead locations 21a–d for each printing pass which are offset from each other as indicated in the media advance direction 8. The effect of printing many smaller drops and fewer larger drops, when combined with advancing the medium 18 between printing passes, is to create the printed image pattern 86 on the print medium 18 in which the large and small ink drops are intermixed on many rows.

For a printhead 21 which uses a flexible polymeric top plate (not shown) to form the nozzles through which the ink drops are ejected, the number of end nozzles exhibiting greater amounts of dot placement error and the number of middle nozzles exhibiting lesser amounts of dot placement error respectively are usually in a proportion between 1:1 and 1:8. More typically the proportion is between 1:3 and 1:6, with the most common ratio being 1 end nozzle for every 4 middle nozzles.

Figure 9A:
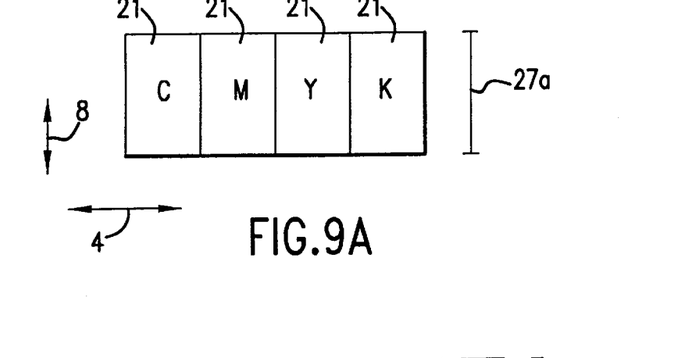
FIGS. 9A–9C are schematic views of alternative relative alignments of multiple printheads in a printer according to FIG. 1.
Figure 9B:
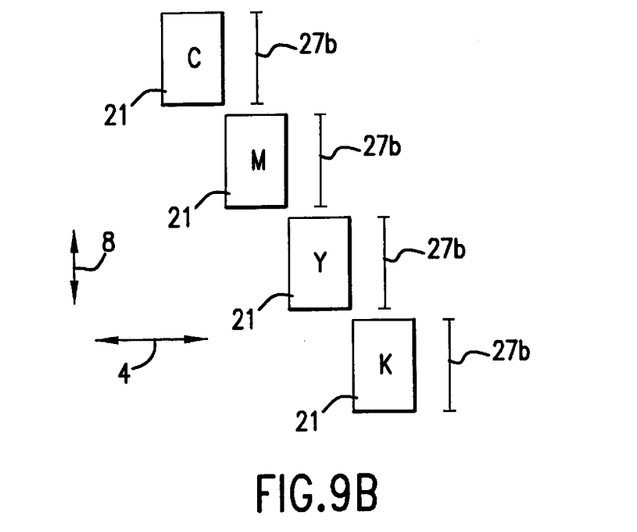
Figure 9C:
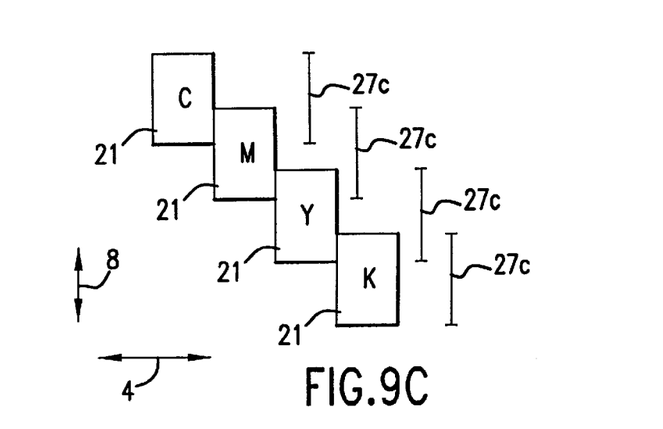
Figure 10A:
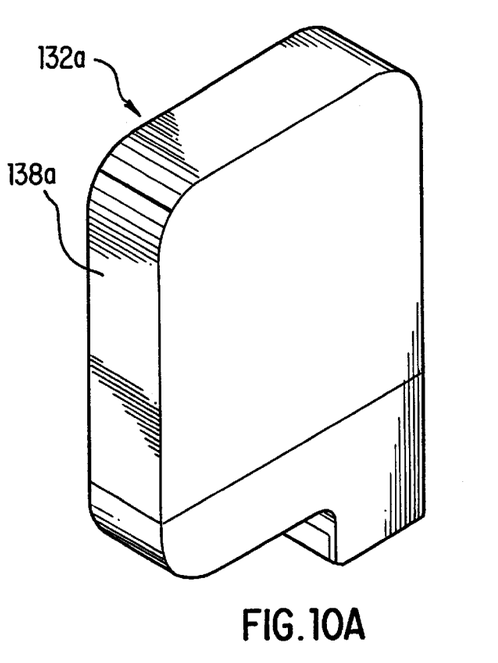
FIGS. 10A–10D is a perspective view of alternative print cartridge and ink distribution systems usable with the printer of FIG. 1.
Figure 10B:
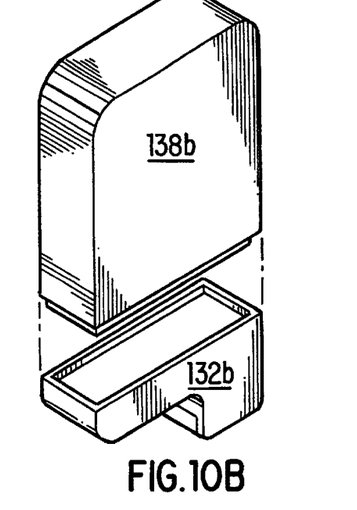
Figure 10C:
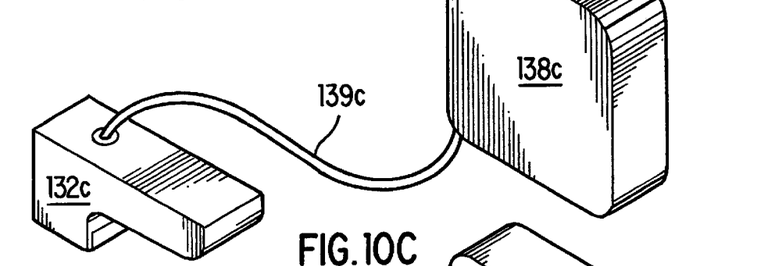
Figure 10D:
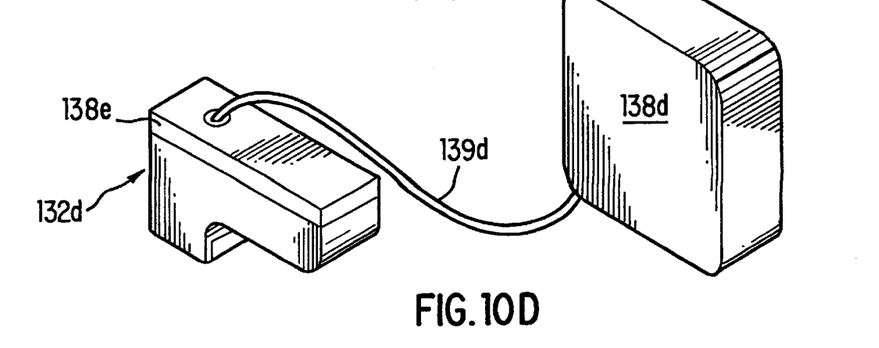

While the present invention has for purposes of illustration been described with reference to a single printhead 21, a printer 10 according to the present invention may contain additional printheads 21, as best illustrated in FIGS. 9A–9C. The printheads 21 may be oriented in the printer 10 in different positions relative to each other. In one embodiment as illustrated in FIG. 9A, four printheads 21 are aligned such that each printhead 21 deposits the ink in substantially an identical swath 27a in a single pass along the scan axis 4. In another embodiment as illustrated in FIG. 9B, the printheads 21 are offset from each other such that each printhead deposits the inks in different swaths 27b in a single pass. In a further embodiment as illustrated in FIG. 9C, all the printheads 21 are partially aligned and partially offset such that two adjacent printheads 21 deposit the inks in a partially overlapping swaths 27c in a single printing pass. In addition, alternative arrangements for mounting the printheads 21 in the carriage 20 and delivering ink to the printheads are usable with the present invention, as illustrated schematically in FIGS. 12A through 12D. Each printhead 21 is housed in a cartridge 132a–132d. A cartridge 132a–132d may contain only one printhead 21 for one ink color, or it may contain multiple printheads for multiple colors, such as a tricolor cartridge containing three printheads for cyan, magenta, and yellow respectively. The multiple printheads may be constructed on a single substrate or on different substrates. The ink may be supplied to the printhead 21 in different ways. In FIG. 10A, an ink reservoir 138a is housed within the print cartridge 132a along with the printhead. In FIG. 10B, an ink reservoir 138b is detachable from the print cartridge 132b, but the reservoir 138b is attached to the print cartridge 132b when they are installed in the carriage 20. In FIG. 10C, the print cartridge 132c does not contain an ink reservoir; ink is supplied to the cartridge 132c instead from an off-chute ink reservoir 138c via a tube 139c. In FIG. 10D, the main ink reservoir 138d is similarly located off-chute and connected to the print cartridge 132d via a tube 139d, but the print cartridge 132d also contains an auxiliary reservoir 138e. The present invention may be utilized with any of these cartridge configurations and ink delivery systems, and with other design alternatives in which the printhead 21 and the print media 18 are in relative motion to each other.

From the foregoing it will be appreciated that the printer and method provided by the present invention represents a significant advance in the art. A printer can be constructed according to the present invention so as to reduce visually objectionable banding that occurs due to nozzle aberrations without significantly reducing the useful life of the printhead. Although several specific embodiments of the invention have been described and illustrated, the invention is not to be limited to the specific methods, forms, or arrangements of parts so described and illustrated. In particular, the invention may be used with bidirectional printing where printing passes occur in both directions of movement along the scan axis 4, or unidirectional printing where printing passes occur only in one direction along the scan axis 4; with even-advance printmodes where the medium 18 is advanced the same distance between passes, or with uneven-advance printmodes in which the medium 18 is advanced different distances between passes; with multipass printers requiring two or more passes to fully print rows on the print medium; with printmasks having any number of cells in width; with all types of swath printers including band printers and drum printers; with all types of inkjet printers including thermal and piezo printing technologies; and with printing systems in which all the components of the printer may not be located in the same physical enclosure. Also, the invention is usable with other types of printheads having lower and higher quality nozzles regardless of where on the printhead those nozzles are located, and of how many nozzles are of lower quality. The invention is also usable with different mixes of hi-fipe and multidrop behavior in individual nozzles. An alternative to multidrop printing which is also usable with the present invention is variable drop volume printing in which the quantity of ink deposited in a single drop can vary, rather than depositing a varying number of same-size drops as is done with multidrop printing. The invention is limited only by the claims.

What is claimed is:

1. A method for incremental printing with an inkjet swath printer by depositing drops of an ink from a printhead into a pixel grid on a print medium, comprising:
   establishing the pixel grid by depositing the drops of the ink in multiple printing passes of the printhead over the print medium in a scan direction and advancing the medium in a media advance direction between at least some of the multiple printing passes; and
   printing into a specific pixel of the grid by depositing both
      a small number of drops in each of several of the printing passes consistently from a first group of nozzles of the printhead, and
      many drops rapidly during at least one of the printing passes consistently from a second group of nozzles of the printhead, wherein the first and second groups of nozzles are selected based upon expected dot placement error for different nozzles of the printhead.

2. The method of claim 1, wherein the expected dot placement error is selected from the group consisting of:
   statistical dot placement error data derived from many tested samples of the printhead;
   theoretical estimated dot placement error derived from a design of the printhead; and
   the statistical and theoretical error in combination.

3. The method of claim 1, wherein:
   at least some of the nozzles in the first group and at least some of the nozzles in the second group are enabled to print substantially the same amount of ink into the pixel grid.

4. The method of claim 1, wherein:
   quantities of nozzles in the first and second nozzle groups in the printhead are respectively in a proportion between 1:1 and 1:8.

5. The method of claim 1, wherein:
   quantities of nozzles in the first and second nozzle groups in the printhead are respectively in a proportion between 1:3 and 1:6.

6. The method of claim 1, wherein:
   quantities of nozzles in the first and second nozzle groups in the printhead are respectively in a proportion of approximately 1:4.

7. A method for incremental printing with an inkjet swath printer by depositing drops of an ink from a printhead into a pixel grid on a print medium, comprising:
   establishing the pixel grid by depositing the drops of the ink in multiple printing passes of the printhead over the print medium in a scan direction and advancing the medium in a media advance direction between at least some of the multiple printing passes; and
   printing into a specific pixel of the grid by depositing
      a small number of drops in each of several of the printing passes consistently from a first group of nozzles of the printhead,
      many drops rapidly during at least one of the printing passes consistently from a second group of nozzles of the printhead, and
      both the small number of drops and the many drops from a third group of nozzles of the printhead.

8. The method of claim 7, particularly for use where the printhead is linearly extended along the media advance direction, and wherein:
   the third group of nozzles is between the first group and the second group.

9. A method for incremental printing with an inkjet swath printer by depositing drops of an ink from a printhead linearly extended along a media advance direction into a pixel grid on a print medium, comprising:
   establishing the pixel grid by depositing the drops of the ink in multiple printing passes of the printhead over the print medium in a scan direction and advancing the medium in the media advance direction between at least some of the multiple printing passes;
   printing into a specific pixel of the grid by depositing
      a small number of drops in each of several of the printing passes consistently from a first group of nozzles substantially near ends of the printhead, and
      many drops rapidly during at least one of the printing passes consistently from a second group of nozzles substantially away from the ends of the printhead.

10. A method for incremental printing with an inkjet swath printer by depositing drops of an ink from a printhead into a pixel grid on a print medium, comprising:
    establishing the pixel grid by depositing the drops of the ink in multiple printing passes of the printhead over the print medium in a scan direction and advancing the medium in a media advance direction between at least some of the multiple printing passes; and
    printing into a specific pixel of the grid by depositing
       one drop in each of several of the printing passes consistently from a first group of nozzles of the printhead, at least two drops rapidly during at least one of the printing passes consistently from a second group of nozzles of the printhead.

11. The method of claim 10, wherein:

the establishing and printing steps are performed with respect to inks of at least two different colors.

12. An inkjet swath printer for incremental printing by depositing drops of an ink from a printhead that is susceptible to swath-height error; comprising:

means for applying a "hifipe" technique to hide at least some of the swath-height error;

means for applying "multidropping" technique to hide at least some of the swath-height error; and means for coordinating both the hifipe-applying means and the multidropping-applying means simultaneously with the printhead.

13. The inkjet swath printer of claim 12, wherein:

the coordinating means utilizes the hifipe-applying means for certain nozzles of the printhead and utilizes the multidropping-applying means for other nozzles of the printhead.

14. A multipass swath printer, comprising:

a frame;

a carriage attached to the frame for relative motion with respect to a print medium having a pixel grid of multiple rows, each of the rows having a plurality of pixel locations;

a printhead mounted in the carriage, the printhead having nozzles through which drops of an ink are deposited onto the print medium, each nozzle capable of depositing drops of the ink onto a corresponding one of the rows when the carriage makes a printing pass over the print medium;

a print controller operatively connected to the printhead for controllably activating the nozzles to deposit the drops of the ink; and a printmask operatively coupled to the print controller to govern the ejection of drops of the ink during multiple printing passes of the carriage over the print medium, the printmask having a hi-fipe mask subpattern enabling a first group of the nozzles to deposit into a specific pixel location a small number of drops in each of several of the passes, and a multidrop mask subpattern enabling a second group of the nozzles to deposit into a specific pixel location many drops rapidly during at least one of the passes.

15. The multipass swath printer of claim 14, wherein:

the mask pattern further includes a composite mask subpattern enabling a third group of the nozzles to deposit into a specific pixel location both the small number of drops in each of several of the passes and the many drops rapidly during at least one of the passes.

16. The multipass swath printer of claim 15, wherein:

the third group of nozzles is disposed on the printhead between the first group and the second group, and wherein the composite mask subpattern is graduated such the small number of drops predominate for nozzles adjacent the first group, and the many drops predominate for nozzles adjacent the second group.

17. The multipass swath printer of claim 15, wherein:

at least some of the nozzles in the first group, at least some of the nozzles in the second group, and at least some of the nozzles in the third group are enabled to print substantially the same amount of ink into the pixel grid.

18. The multipass swath printer of claim 14, wherein the printhead ejects ink onto each of the rows at a corresponding plurality of ink deposition locations, and wherein the first group of the nozzles have greater dot placement errors between the pixel locations and the ink deposition locations and the second group of the nozzles have lesser dot placement errors between the pixel locations and the ink deposition locations.

19. The multipass swath printer of claim 14, wherein the printhead ejects ink onto each of the rows at a corresponding plurality of ink deposition locations, and wherein the first group of the nozzles have a relatively higher amount of dot placement error between the pixel locations and the ink deposition locations and the second group of the nozzles have a relatively lower amount of dot placement error between the pixel locations and the ink deposition locations.

20. The multipass swath printer of claim 14, further including:

at least two printheads mounted in the carriage, all the printheads aligned relative to each other such that the printheads deposit the inks in substantially a same swath in a single printing pass.

21. The multipass swath printer of claim 14, further including:

at least two printheads mounted in the carriage, all the printheads offset relative to each other such that the printheads deposit the inks in different swaths in a single printing pass.

22. The multipass swath printer of claim 14, further including:

at least two printheads mounted in the carriage, all the printheads partially aligned relative to each other such that two adjacent printheads deposit the inks in an overlapping swath in a single printing pass.

23. The multipass swath printer of claim 14, further including:

a tri-color cartridge containing three printheads mounted in the carriage, the three printheads aligned relative to each other such that the printheads deposit the inks in substantially an identical swath in a single printing pass.

24. The multipass swath printer of claim 14, further including:

a tri-color cartridge containing three printheads mounted in the carriage, the three printheads offset relative to each other such that the printheads deposit the inks in different swaths in a single printing pass.

25. The multipass swath printer of claim 14, wherein:

the mask pattern has a separate pattern position for each of the nozzles.

26. The multipass swath printer of claim 14, wherein each of the nozzles partially prints an individual row of the pixel grid in each of the multiple printing passes, the system further comprising:

a medium advance mechanism mounted on the frame for advancing the print medium relative to the printhead so as to change the one of the multiple rows on which a given one of the nozzles prints.

27. The multipass swath printer of claim 14, wherein:

at least some of the nozzles in the first group and at least some of the nozzles in the second group are enabled to print substantially the same amount of ink into the pixel grid.

28. A method for printing with an inkjet printer, comprising:

establishing a grid of pixels on a print medium by depositing drops of an ink in multiple printing passes in a scan direction and advancing the print medium in a media advance direction between at least some of the multiple printing passes;

enabling a first group of nozzles to deposit a relatively smaller amount of the ink in a first set of the pixels during each of several of the printing passes; and enabling a second group of nozzles to deposit a relatively larger amount of the ink in a second set of the pixels during at least a single one of the printing passes, wherein the total amounts of ink that the first group of nozzles and the second group of nozzles are enabled to deposit are substantially the same.

29. The method of claim 28, further comprising:

enabling a third group of nozzles to deposit in a third set of the pixels both the relatively smaller amount of the ink during each of several of the printing passes and the relatively larger amount of the ink during at least a single one of the printing passes, wherein the total amount of ink the third group of nozzles is enabled to deposit is substantially the same as the first and second groups.

30. The method of claim 28, wherein:

the establishing and the advancing are performed generally concurrently.

31. The method of claim 28, wherein:

the establishing and printing steps are performed with respect to inks of at least two different colors.

32. The method of claim 28, wherein:

each of the relatively smaller amounts of the ink further comprises a relatively lesser number of ink drops, and each of the relatively larger amounts of the ink further comprises a relatively greater number of ink drops.

33. The method of claim 28, wherein:

each of the relatively smaller amounts of the ink further comprises a relatively smaller volume ink drop, and each of the relatively larger amounts of the ink further comprises a relatively larger volume ink drop.

* * * * *